United States Patent [19]

Vestergaard

[11] Patent Number: 4,651,927
[45] Date of Patent: Mar. 24, 1987

[54] PLANT FOR DE-ICING SURFACES

[76] Inventor: Godtfred Vestergaard, 18, Niels Frederiksensvej, DK-4000 Roskilde, Kornerup, Denmark

[21] Appl. No.: 678,556
[22] PCT Filed: Mar. 20, 1984
[86] PCT No.: PCT/DK84/00020
   § 371 Date: Nov. 20, 1984
   § 102(e) Date: Nov. 20, 1984
[87] PCT Pub. No.: WO84/03644
   PCT Pub. Date: Sep. 27, 1984

[30] Foreign Application Priority Data

Mar. 21, 1983 [DK] Denmark .............. 1276/83

[51] Int. Cl.⁴ .............. B05B 7/00; A01G 25/09; A62C 31/00; A62C 31/30
[52] U.S. Cl. .............. 239/61; 239/172; 239/304; 239/305; 417/428
[58] Field of Search .......... 239/61, 172, 304, 305; 417/426, 428

[56] References Cited

U.S. PATENT DOCUMENTS

| | | | |
|---|---|---|---|
| 3,049,267 | 8/1962 | Edwards et al. | 239/304 |
| 3,097,764 | 7/1963 | Loeser | 239/304 |
| 3,421,694 | 1/1969 | Müller | 239/304 X |
| 4,113,182 | 9/1978 | Brago | 239/304 |
| 4,376,512 | 3/1983 | Kistner | 239/304 X |

Primary Examiner—Joseph F. Peters, Jr.
Assistant Examiner—Patrick N. Burkhart
Attorney, Agent, or Firm—Silverman, Cass, Singer & Winburn, Ltd.

[57] ABSTRACT

A plant for de-icing especially surfaces of aeroplanes, comprising the use of at least two sources (10, 12) of liquid media that are different from each other and capable of being sprayed separately or as a mixture, comprising a number of positive liquid pumps (16, 22) corresponding to the number of media, which pumps all have the same capacity or a predetermined interrelated capacity ratio and terminate in a common spray pipe (24). The connection of the liquid pumps to the sources includes at least one of the sources to at least one of the liquid pumps. In a hydraulic system comprising hydraulic motors (56, 52) for driving the liquid pumps (16, 22) at least two of motors are connected to a common hydraulic pressure pump (32) controlled by way of pressure compensation (33) to work with at least two pressure stages subject to a ratio corresponding to that of the capacity of at least one liquid pump to the total capacity of both liquid pumps. In such a plant the compostion of the spray liquid to be dispensed is determined solely by the capacity of the liquid pumps, thereby eliminating any throttling effects which may cause the de-icing medium to coagulate.

6 Claims, 1 Drawing Figure

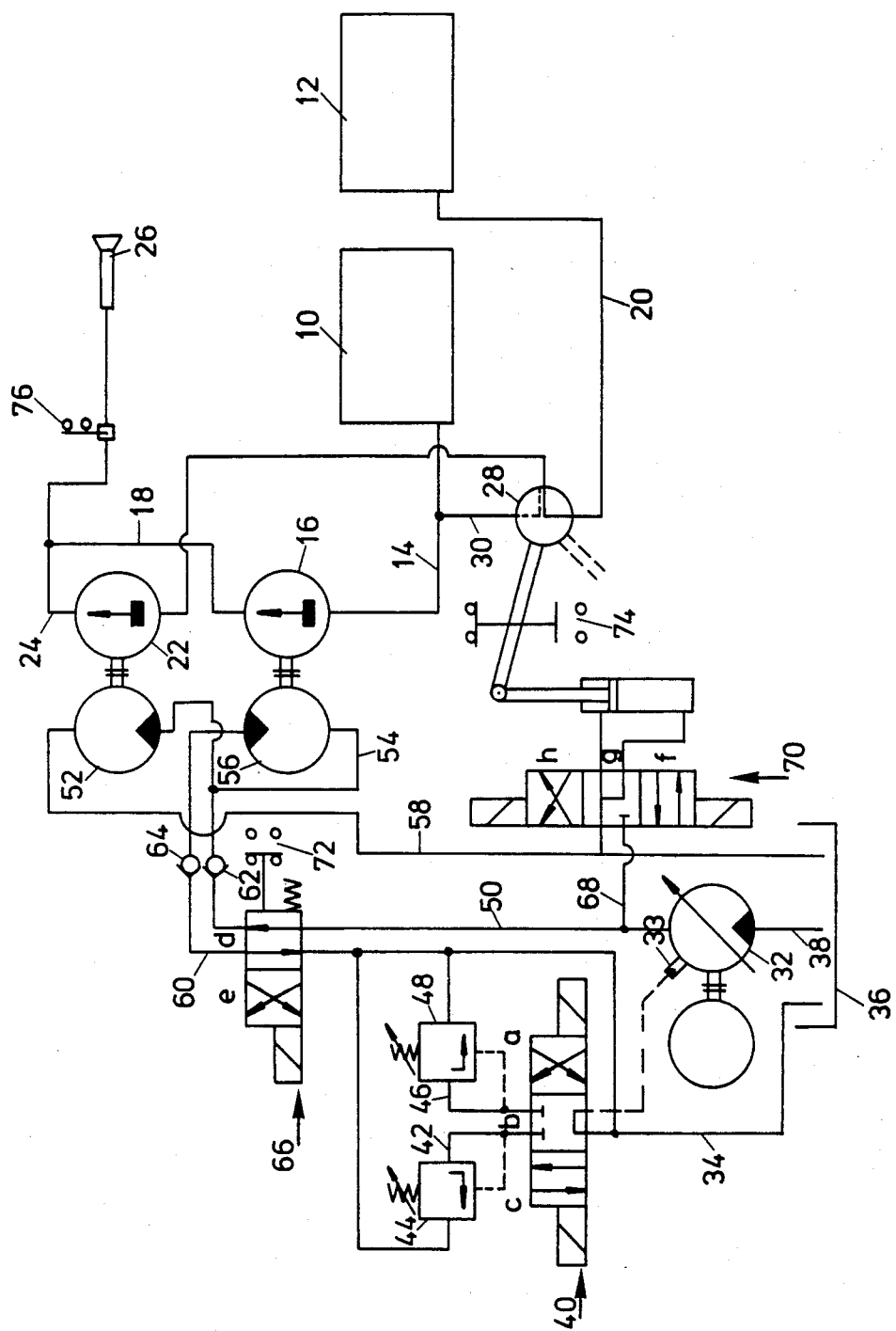

PLANT FOR DE-ICING SURFACES

The present invention relates to a plant for de-icing, in particular surfaces of aeroplanes, comprising the use of at least two sources of liquid media that are different from each other and capable of being sprayed separately or as a mixture.

With a view to flight safety, heavy demands are made on the efficiency of the de-icing operation, and in this context it is important to ensure that the spray liquid is of the desired type according to whether it should consist of one medium or a mixture of several media.

The prior art teaches to control the type of spray liquid dispensed by means of an adjustable three-way valve, a volumetric flow meter or by adjustment of the revolutions of a rotary pump, but experience shows that these methods of control frequently fail to be sufficiently accurate. A further drawback of this prior art is that it involves no control of which type of spray liquid is dispensed.

It is the object of the present invention to provide a plant which in a simple manner affords the possibility of accurate adjustment of the desired type of spray liquids.

According to the invention, this object is achieved by the plant comprising a number of positive liquid pumps corresponding to the number of media, which pumps all have the same capacity or a predetermined interrelated capacity ratio (liters/min) and terminate in a common spray pipe, and where the connection of the pumps to the sources of media includes at least one multi-way valve for connecting at least one of these sources to at least one of the pumps.

In this plant the composition of the spray liquid to be dispensed is thus determined solely on the basis of the capacity of the liquid pumps. As a result, it is possible to avoid mixing valves which may be not only inaccurate but also have a throttle effect. De-icing media are frequently sensitive to throttling down, as this may cause the media to coagulate. In the plant according to the invention this risk of inaccuracy in terms of operation has been eliminated, too.

The plant according to the invention furthermore allows it to be operated in a simple manner by means of a hydraulic system. This renders the system suitable for mobile, such as self-propelling de-icing stations. Seeing that the pumps are driven by respective hydraulic motors, the system according to the invention may be designed to the effect that the motors of at least two liquid pumps are connected to a common hydraulic pressure pump controlled by way of pressure compensation to work with at least two pressure stages subject to a ratio corresponding to that of the capacity of at least one pump to the total capacity of both pumps. This ratio, for instance, could be 1:2. Such an embodiment offers the specific advantage that the liquid system need not include a relief valve which may cause coagulation, as an increase of pressure in the system, for example as a result of the jet being closed by an adjustable flow interrupter arranged in the spray pipe, may at once be transmitted through the hydraulic motors to the hydraulic pressure pump and reset same. It is achieved at the same time that the pump delivering de-icing medium does not work it excessively.

Furthermore, according to the invention, it is possible to provide in a simple manner efficient control as to whether the desired type of spray liquid is dispensed, as the hydraulic control of the pressure pump and the control of the multi-way valve include switches for independent detection of the operating position of the flow system.

The invention will be further explained below with reference to the drawing, which by way of an operating diagram illustrates an embodiment of a de-icing plant designed according to the invention.

The plant shown includes two sources of liquid media, there being provided a tank 10 for water and another tank 12 for de-icing medium.

By means of a pipe 14 the tank 10 is connected to the suction side of a pump 16, whose delivery side is connected to a discharge pipe 18.

By means of a pipe 20 the tank 12 is connected to the suction side of a pump 22, whose delivery side is connected to a discharge pipe 24. The pipes 18 and 24 are joined to terminate in a jet 26.

In the pipe 20 there is interposed a three-way valve 28 which through a branch 30 is likewise connected to the pipe 14.

The pumps 16 and 22 have the same capacity X liters/min.

The system operates as follows:

EXAMPLE 1

With the valve 28 in the position indicated by fully drawn lines and the pump 22 operating, there are sprayed through the jet 26 X liters/min of de-icing medium from the tank 12.

EXAMPLE 2

With the valve 28 in the position indicated by fully drawn lines and both pumps 16 and 22 operating, there are passed both X liters/min of de-icing medium from the tank 12 and X liters/min of water from the tank 10 to the jet 26, i.e. a fifty-fifty mixture of medium from both tanks 10 and 12 in an amount of 2 X liters/min.

EXAMPLE 3

With the valve 28 changed to the dotted-line position, in which the pump 22 is cut off from the tank 12 and connected to the pipe 14 through the branch 30, and with both pumps 16 and 22 operating, there are passed X liters/min from each pump to the jet 26, i.e. a total amount of water of 2 X liters/min.

Hence, this system makes it possible in a simple yet extremely accurate manner to dispense quickly de-icing medium only, water only or both media in combination and always in the amounts required for the de-icing treatment.

Within the scope of the invention it will be possible to extend the system to include more sources of media, thereby allowing for more charging and mixing ratios, as it is merely required to use a corresponding number of additional pumps.

Rather than having the same capacity, the pumps 16 and and 22 may also have a predetermined interrelated capacity ratio.

The pumps 16 and 22 are driven by a hydraulic system shown in the left-hand side of the drawing.

The system comprises a hydraulic pump 32 which is pressure-compensated and provided for this purpose with pressure control means 33, from which a pipe 34 extends, terminating in a tank 36. From said tank 36 a suction pipe 38 extends to the pressure pump 32.

In between the pressure control means 33 and the tank 36 the pipe 34 is connected to a valve 40, which has three positions a, b and c. By means of a pipe 42 the opposite side of the valve 40 is connected to a pressure valve 44 and by means of a pipe 46 to a pressure valve 48.

The pressure valves 44 and 48 are adjusted to the effect that the pump 32 will have two pressure stages in the ratio 1:2.

The hydraulic system operates as follows:

EXAMPLE 4

In the shown position b the pressure control 33 has unobstructed passage from the pump 32 through the pipe 34 to the tank 36. This means that the pump 32 is operating at a pressure=0 bar.

EXAMPLE 5

By switching the valve 40 to position a, there is established communication between the pressure control means 33 and the pressure valve 44, which means that the pressure of the pump 32 is increased to a level corresponding to the adjustment of the pressure valve 44=p bar.

EXAMPLE 6

By switching the valve 40 to position c, there is established communication between the pressure control means 33 and the pressure valve 48, which means that the pressure of the pump is increased to a level corresponding to the adjustment of the pressure valve 48=2 bar.

By means of a pipe 50 the delivery side of the pump 32 is connected to the input side of a motor 52 which is connected to the pump 22. A branch pipe 54 connected to the pipe 50 leads to the input side of a motor 56 which is connected to the pump 16. Through a pipe 58 the output side of the motor 52 is in communication with the tank 36. Through a pipe 60 the output side of the motor 56 is connected to the pipe 34 and via the latter to the tank 36. Non-return valves 62 and 64 are interposed in the pipes 50 and 60. Both pipes furthermore pass a valve 66 which is adjustable to assume two positions d and e.

The pump system operates as follows:

EXAMPLE 7

With the valve 66 in position d and the valve 40 in position a, the pump 32 transmits the pressure (=p bar) through the pipe 50 to the motor 52 driving the pump 22 which thereby pumps X liters/min of 100% de-icing medium from the tank 12.

Admittedly, the pressure from the pump 32 is also transmitted to the motor 56, but the flow through the motor is blocked by the non-return valve 64.

EXAMPLE 8

With the valve 66 in position e and the valve 40 in position c, the pump 32 transmits the pressure to the motor 56 and, as the non-return valve 62 is closed, also further on to the motor 52. This means that both pumps 16 and 22 each delivers X liters/min.

Through a branch pipe 68 the pressure pipe 50 is in communication with a valve 70 which controls the three-way valve 28.

By moving the valve 70 to position f simultaneously carrying Example 8 into effect, the valve 28 will assume the position indicated by fully drawn lines, after which, as explained in Example 2, a half-and-half mixture of water and de-icing medium in a total amount of 2 X liters/min is supplied to the jet 26. The valve 40 is in position c, see Example 6.

EXAMPLE 9

This is subject to the same conditions as stated in Example 8, the valve 40 being in position c (Example 6) and the valve 70 in position h, whereby the valve 28 will assume the dotted-line position (Example 3). In this case the jet 26 is supplied with 2 X liters/min of water only. During this operation the valve 40 should still be in position c to produce a working pressure of two p bar, equal to a pressure drop across each motor 52 and 56 of p bar.

The valve 66 is connected to a position indicator 72, and the valve 28 is connected to a position indicator 74. The pulses from these indicators may be transmitted to a central point of monitoring to show whether the valves are in the position corresponding to the desired type of spray liquid.

In the pipe 24 leading to the jet 26 there is interposed a timed flow interrupter 76 which is adapted to move the valve 40 to position b and thereby reset the pressure pump 32 in case no spray liquid has been used for a predetermined period of time.

In case of employing more liquid pumps than shown, it is possible to use more hydraulic motors connected in series.

What is claimed is:

1. A plant for de-icing especially surfaces of aeroplanes, comprising:
   (a) at least two sources of liquid media that are different from each other and capable of being sprayed separately or as a mixture;
   (b) a plurality of positive liquid pumps, the number of pumps being the same as the number of said sources, the interrelated capacity of said pumps having a predetermined ratio;
   (c) a common spray pipe connected to the outputs of said pumps;
   (d) means for connecting the inputs of said pumps to said sources, said means including:
      (d1) means for connecting each said source to the input of a corresponding pump;
      (d2) a multi-way valve interposed between said sources and said pumps, and capable of disconnecting at least one said source from its corresponding positive liquid pump, and connecting another source to the disconnected pump; and
      (d3) control means for said valve;
   (e) a plurality of hydraulic motors for driving said plurality of positive liquid pumps;
   (f) a common hydraulic pressure pump connected to the hydraulic motors of at least two said positive liquid pumps; and
   (g) pressure compensation control means controlling said common hydraulic pressure pump operable to work with at least two pressure stages, subject to a ratio corresponding to a ratio of the capacity of at least one positive liquid pump to the total capacity of said at least two positive liquid pumps.

2. A plant as claimed in claim 1 characterized in that the positive liquid pumps all have the same capacity.

3. A plant as claimed in claim 1 characterized in that an adjustable flow interrupter is arranged in the spray pipe.

4. A plant as claimed in claim 2 characterized in that an adjustable flow interrupter is arranged in the spray pipe.

5. A plant as claimed in claim 1 characterized in that said pressure compensation control means and said multi-way valve control means include position indicating switches for independent indication of the proper condition of said respective control means to provide the desired spray liquid.

6. A plant as claimed in claim 2 characterized in that said pressure compensation control means and said multi-way valve control means include position indicating switches for independent indication of the proper condition of said respective control means to provide the desired spray liquid.

* * * * *